United States Patent
Lin et al.

(10) Patent No.: US 7,460,593 B2
(45) Date of Patent: Dec. 2, 2008

(54) SIGNAL PROCESSING DEVICE CAPABLE OF ENHANCING CORRECTNESS OF FEEDBACK SIGNALS

(75) Inventors: Hou-Wei Lin, Taipei (TW);
Shieh-Hsing Kuo, Taipei (TW); Yi-Lin Li, Kao-Hsiung (TW); Kuang-Yu Yen, Tai-Chung (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 687 days.

(21) Appl. No.: 10/709,462

(22) Filed: May 7, 2004

(65) Prior Publication Data

US 2005/0078746 A1    Apr. 14, 2005

(30) Foreign Application Priority Data

Oct. 14, 2003    (TW) ............................... 92128440 A

(51) Int. Cl.
*H04B 1/38*     (2006.01)
*H04L 5/16*     (2006.01)
*H04L 27/10*    (2006.01)
*H04L 27/18*    (2006.01)

(52) U.S. Cl. ................. 375/233; 375/229; 375/232; 375/341; 714/774; 708/322; 708/323

(58) Field of Classification Search ................ 375/240.01–240.07, 130–239, 241–377; 370/241, 204, 465; 341/168–169, 200; 714/774; 708/322–323
See application file for complete search history.

(56) References Cited

U.S. PATENT DOCUMENTS

| | | | |
|---|---|---|---|
| 5,754,591 A | 5/1998 | Samueli et al. | |
| 5,799,037 A * | 8/1998 | Strolle et al. | 375/233 |
| 6,668,014 B1 * | 12/2003 | Endres et al. | 375/232 |
| 6,680,971 B1 * | 1/2004 | Tazebay et al. | 375/235 |
| 6,873,279 B2 * | 3/2005 | Jones et al. | 341/155 |
| 7,046,726 B2 * | 5/2006 | Jayaraman et al. | 375/233 |
| 7,145,968 B2 * | 12/2006 | Kuo et al. | 375/341 |
| 2001/0024479 A1 * | 9/2001 | Samarasooriya | 375/326 |

OTHER PUBLICATIONS

"amount." Merriam-Webster Online Dictionary. 2008. Merriam-Webster Online. May 2, 2008 <http://www.merriam-webster.com/dictionary/amount>.*

Giorgio Picchi, Giancarlo Prati; Blind Equalization and Carrier Recovery Using a "Stop-and-Go" Decision-Directed Algorithm; IEEE transactions on communications; Sep. 1987; p. 877-p. 887; vol. COM-35, No. 9.

* cited by examiner

*Primary Examiner*—Shuwang Liu
*Assistant Examiner*—James M Perez
(74) *Attorney, Agent, or Firm*—Winston Hsu

(57) ABSTRACT

A signal processing device for processing a passband signal to generate an equalized signal includes a passband adaptive equalizer for generating the equalized signal according to the passband signal, including at least one feed-forward equalizer (FFE) and one feedback equalizer (FBE), and a multilevel quantizer coupled with the passband adaptive equalizer for selectively utilizing a single predetermined threshold or a plurality of multiple predetermined thresholds to quantize the equalized signal in order to generate a sliced signal.

14 Claims, 2 Drawing Sheets

SIGNAL PROCESSING DEVICE CAPABLE OF ENHANCING CORRECTNESS OF FEEDBACK SIGNALS

BACKGROUND OF INVENTION

1. Field of the Invention

The invention relates to a signal processing device, and more particularly, to a signal processing device for processing a passband signal.

2. Description of the Prior Art

Digital data transmission becomes important day by day in modern electronic communication systems. In conventional digital data transmission systems, digital transmission signals generally include a series of encoded symbols, and each of them represents a specific quantity of data bits in the digital transmission signals. Quadrature amplitude modulation (QAM) is a typical encoding method, wherein several continuous bits (e.g. 6 bits or 7 bits) are encoded into corresponding encoded symbols, and each of the symbols is represented in form of a complex signal, including an in-phase component I and a quadrature-phase component Q. The value of the complex signal is located on one of the predetermined points (a.k.a. constellation) in a specific number on a complex plane. The complex signal is then modulated on a radio frequency (RF) carrier. There are still several types of modulation, such as vestigial sideband modulation (VSBM), staggered QAM, etc.

In a typical communication system, since the characters of the communication channel are not always perfect (such as multi-path), an equalizer is required for a receiving end to resolve inter-symbol interference (ISI) problem. However, a typical equalizer requires a training sequence to train the equalizer before the communication is started. In such a manner, although inter-symbol interference (ISI) problem is resolved, after the training sequence is applied, the throughput of the system decreases accordingly. Therefore, various types of blind equalization (i.e. a training method without any advance training sequence) have been introduced. Besides, the ISI problem is also due to "carrier not synchronization" between a transmitter and a receiver. The blind equalization can be divided into passband blind equalization (cf. U.S. Pat. No. 5,799,037) and baseband blind equalization (cf. U.S. Pat. No. 5,754,591). In a circuit, baseband blind equalization is easier to implement than passband blind equalization, but due to the interaction between the equalizer and a carrier synchronization circuit, there is a serious problem on convergence. Therefore, various types of passband blind equalization are introduced to solve the problem on convergence.

Please refer to FIG. 1 showing a conventional signal processing device 100. The signal processing device 100 is for processing a passband signal (PBS) to generate an equalized signal (ES), which includes a feedforward equalizer (FFE) 110 for generating a first passband signal (PBS1) according to the PBS, a feedback equalizer (FBE) 140 for generating a second passband signal (PBS2) according to a sliced signal (SS), an adder 120 coupled with the FFE 110 and the FBE 140 for generating the ES according to the PBS1 and the PBS2, and a quantizer 130 coupled with the adder 120 for generating the SS according to the ES. The quantizer 130 functions similarly to a data slicer in that it can slice the data of the ES in a specific slice mode (i.e. using a specific threshold).

In the structure shown in FIG. 1, the quantizer 130 takes the SS as a correct signal and feeds it back to the FBE 140 in order to eliminate the interference between symbols of a post-cursor. When the SS generated by the quantizer 130 is incorrect, the incorrect signal is still fed back to the FBE 140 so that the interference between symbols is not eliminated but instead may become more severe, resulting in the system being unable to converge. This is a main problem of the conventional art.

SUMMARY OF INVENTION

It is therefore one of the objects of the claimed invention to provide a signal processing device capable of enhancing correctness of feedback signals to solve the problems mentioned above.

Briefly, a signal processing device for processing a passband signal to generate an equalized signal includes a passband adaptive equalizer for generating the equalized signal according to the passband signal, including at least one feedforward equalizer (FFE) and one feedback equalizer (FBE), and a multilevel quantizer coupled with the passband adaptive equalizer for selectively utilizing a single predetermined threshold or a plurality of multiple predetermined thresholds to quantize the equalized signal in order to generate a sliced signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
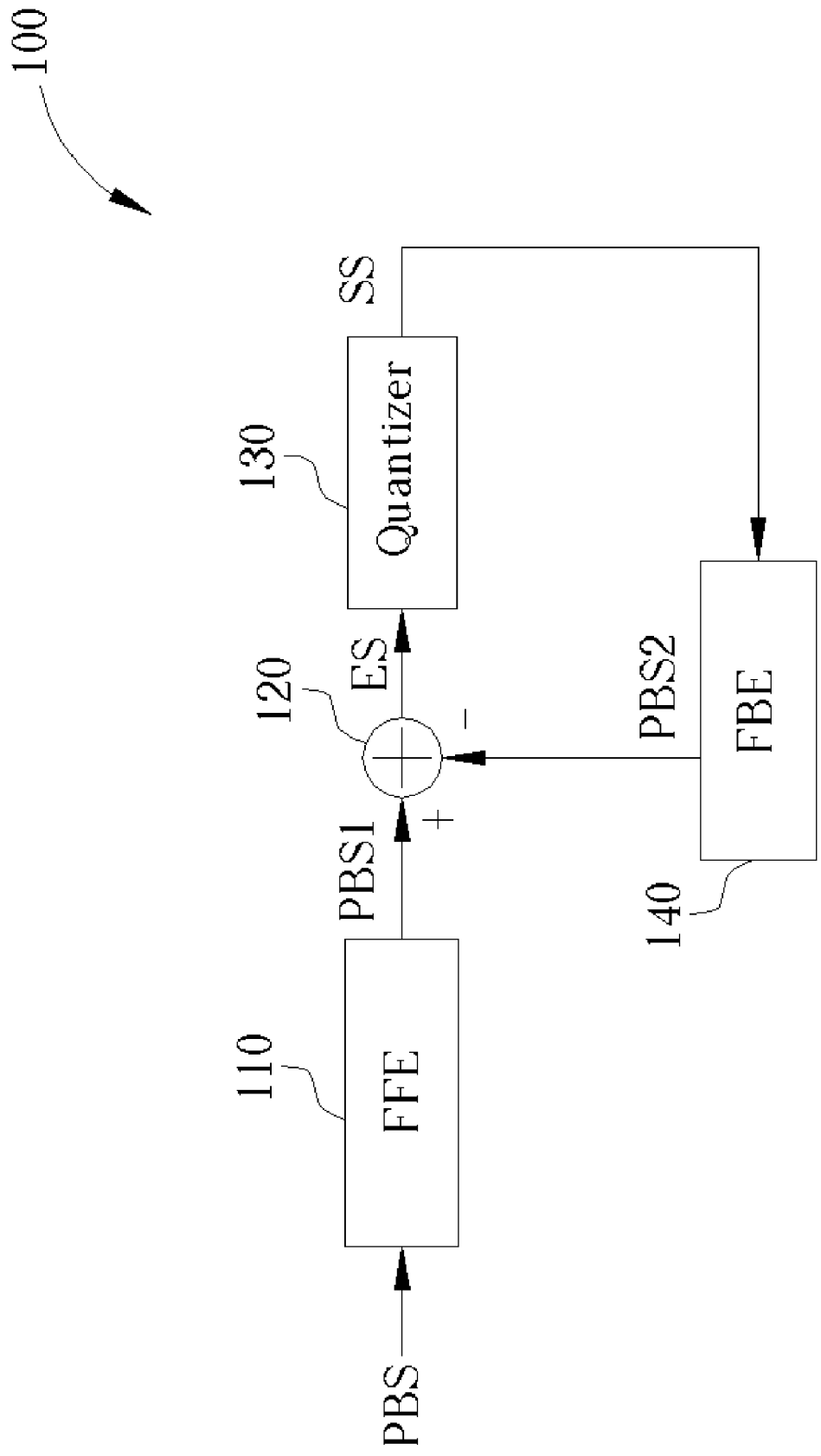
FIG. 1 illustrates a conventional signal processing device.
Figure 2:
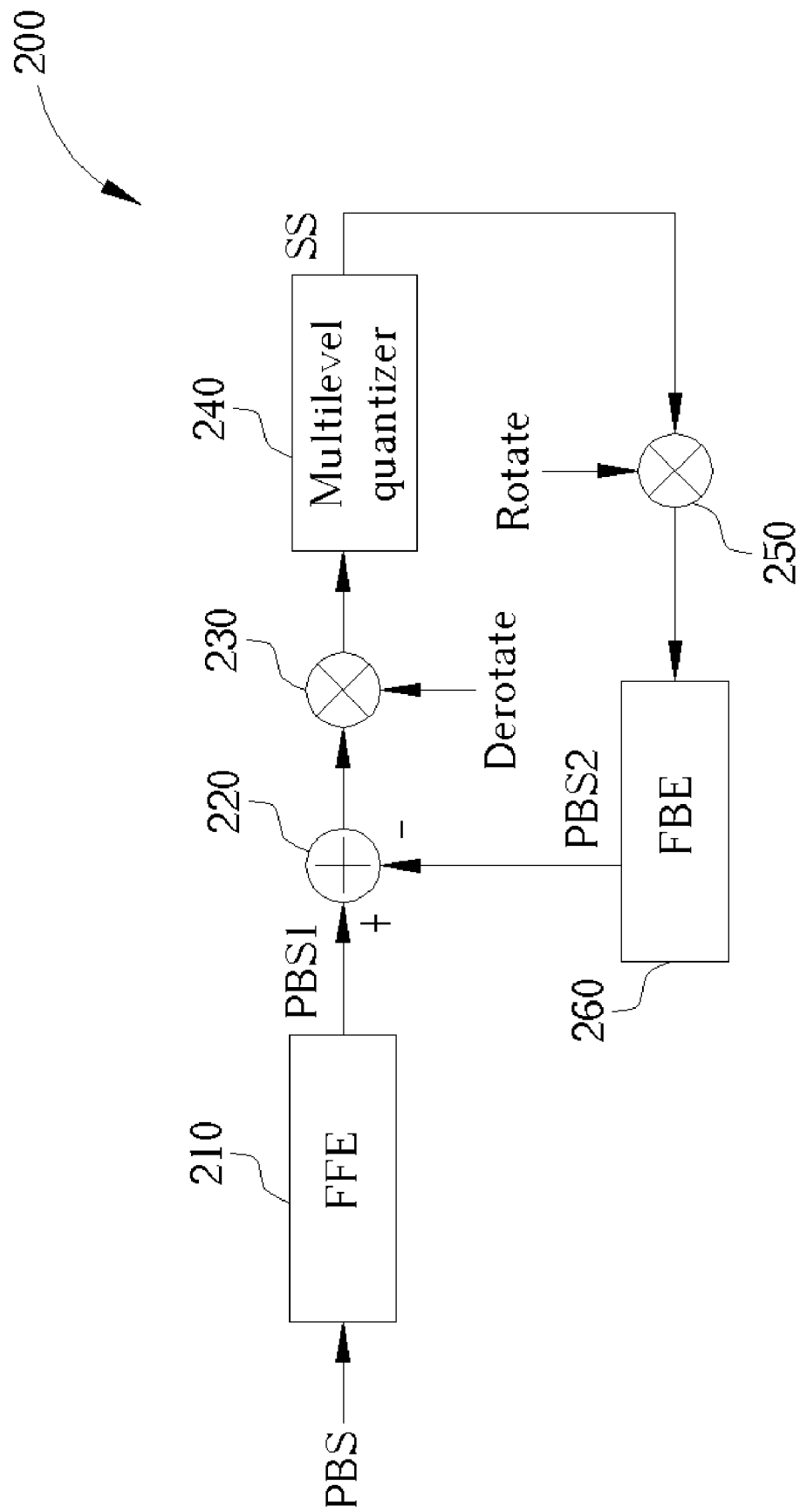
FIG. 2 illustrates a signal processing device according to the embodiment of the present invention.

Please refer to FIG. 2 showing a signal processing device according to the embodiment of the present invention. The signal processing device 200 is for processing a PBS to generate an ES, which includes an FFE 210 for generating a PBS1 according to the PBS, an FBE 260 for generating a PBS2 according to an SS, an adder 220 coupled between the FFE 210 and the FBE 260 for generating the ES according to the PBS1 and the PBS2, a multilevel quantizer 240 coupled with the adder 220 for generating the SS according to the ES, a control logic (not shown) for determining whether the multilevel quantizer 240 is in a reliable or unreliable status, a derotator 230 coupled between the adder 220 and the multilevel quantizer 240 for derotating the ES and inputting it to the multilevel quantizer 240, and a rotator 250 coupled between the multilevel quantizer 240 and the FBE 260 for rotating the SS and inputting it to the FBE 260. The FFE 210, the FBE 260, and the adder 220 can be called a passband adaptive equalizer, which outputs the ES according to the PBS received. The multilevel quantizer 240 selects operating in a normal slice mode or a multiple slice mode according to the result determined by the control logic. If the control logic determines that the multilevel quantizer 240 is in reliable status, normal slice mode is applied, and if it is in unreliable status, multiple slice mode is applied.

Compared with normal slice mode, when the multilevel quantizer 240 applies multiple slice mode, the multilevel quantizer 240 uses a plurality of predetermined thresholds for data slicing; that is, the multilevel quantizer 240 uses more bits to represent the SS. Take a one-dimensional signal for example. In normal slice mode, there is only one predetermined threshold, i.e. 0. This means that when the received signal is larger than 0, the sliced signal is 1, and when the received signal is less than 0, the sliced signal is −1 (this can be regarded as the multilevel quantizer 240 using a single bit to represent the SS).

In the present embodiment, there are three thresholds 0.66, 0, −0.66 in the multiple slice mode. When the received signal is larger than 0.66, the sliced signal is 1, when the received signal is between 0.66 and 0, the sliced signal is 0.33, when the received signal is between 0 and −0.66, the sliced signal is −0.33, and when the received signal is less than −0.66, the sliced signal is −1 (this can be regarded as the multilevel quantizer 240 using two bits to represent the SS). The description above is a simplified example. The operation of the multilevel quantizer 240 can be much more complicated than the example because in a practical communication system, the signal is a two-dimensional signal on a complex plane with numerous predetermined points. However, people skilled in the art would easily implement the multilevel quantizer 240 for quantizing a two-dimensional signal base on the description of the specification.

In the present embodiment, the control logic determines whether the multilevel quantizer 240 is in a reliable or unreliable status by error decision and stop-and-go decision. When the multilevel quantizer 240 is determined to be in reliable status by both error decision and stop-and-go decision or by at least one of those decisions, normal slice mode is applied. Otherwise, multiple slice mode is applied.

The error decision is hereby described. The control logic compares the signals received by the multilevel quantizer 240 with a predetermined level in normal slice mode. If the difference is less than a predetermined threshold, the multilevel quantizer 240 is in reliable status. Take a one-dimensional signal for example. Assume that the predetermined levels are 1 and −1 in normal slice mode (i.e. the sliced signal can be 1 or −1), and the predetermined threshold is 0.5; when the received signal is 0.3, the sliced signal will be 1. However, the difference between 1 and 0.3 is 0.7, which is over the threshold 0.5, meaning that the multilevel quantizer 240 will be determined to be in an unreliable status according to error decision, and the multilevel quantizer 240 will use more predetermined levels for data slicing (i.e. sliced signals can be 1, 0.33, −0.33, −1). In this case, the received signal being 0.3 will be sliced into 0.33 by the multilevel quantizer 240 in the multiple slice mode. In such a manner, the correctness of the feedback signal to the FBE 260 can be enhanced, and the convergence of the system can be improved.

The stop-and-go decision is hereby described. The stop-and-go decision calculates a series of possible signal values (i.e. possible points on the complex plane) according to a constant modulus algorithm. In the present embodiment, the stop-and-go decision means comparing the signals received by the multilevel quantizer 240 with a predetermined level and comparing the signals received by the multilevel quantizer 240 with a value resulting from the constant modulus algorithm. If the differences from the two comparisons have the same sign (positive/negative), the multilevel quantizer 240 is in a reliable status. Take a one-dimensional signal for example. Assume that the predetermined levels are 1 and −1 in normal slice mode. If the values resulting from the constant modulus algorithm are 0.7 and −0.7, and the received signal is 0.8, then the difference between 1 and 0.8 is 0.2, and the difference between 0.7 and 0.8 is −0.1. The two differences have different signs so that the multilevel quantizer 240 will be determined to be in an unreliable status, and the multilevel quantizer 240 will use more predetermined levels for data slicing. In the case that the two differences have the same sign, the multilevel quantizer 240 will be determined to be in a reliable status. For the detail of the stop-and-go decision, please refer to "Blind Equalization and Carrier Recovery Using a "Stop-and-go" Decision-directed Algorithm", PICCHI and PRATI, IEEE Transactions on Communications, VOL. COM-35, NO. 9, September, 1987, which is cooperated by reference herein.

Additionally, the present embodiment installs the derotator 220 and the rotator 250 respectively in the front set and the rear set of the multilevel quantizer 240. In such a manner, the multilevel quantizer 240 can output multi-bit sliced signal without a more complicated circuit. Thus, the present invention utilizes this structure to output multi-bit sliced signals when the multilevel quantizer 240 is in multiple slice mode. The multi-bit sliced signals can be rotated by the rotator 250 to generate multi-bit passband signals and feed them back to the FBE 260. Furthermore, the input signal of the FBE is a passband signal instead of a bassband signal as in the prior art.

The signal processing device according to the embodiment of the present invention utilizes a multilevel quantizer having a normal slice mode and multiple slice mode for data slicing. Since the system determines different slice modes according to the status of the multilevel quantizer, the correctness of the feedback signal can be enhanced, and the convergence of the whole system is improved.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A signal processing device for processing a received signal to generate a sliced signal, comprising:

an equalizer for generating an equalized signal according to the received signal;

a multilevel quantizer, coupled to the equalizer, for utilizing X threshold/thresholds to quantize the equalized signal to thereby output the sliced signal being one of at least X+1 predetermined levels when a first mode is adopted, and utilizing Y thresholds to quantize the equalized signal to thereby output the sliced signal being one of at least Y+1 predetermined levels when a second mode is adopted, wherein the X and the Y are positive integers, the Y is more than the X, and the at least Y+1 predetermined levels are more than the at least X+1 predetermined levels; and a control logic for adopting one of the first mode and the second mode by executing the following steps:

adopting the first mode and then comparing the equalized signal with the sliced signal which is the one of the at least X+1 predetermined levels for obtaining a first difference and comparing the equalized signal with a predetermined value which is different from any of the sliced signal and the X threshold/thresholds for obtaining a second difference;

adopting the second mode instead of the first mode when the first difference and the second difference together indicate an unreliable status; and adopting the first mode when the first difference and the second difference together indicate a reliable status.

2. The device of claim 1 wherein the equalizer comprises a feed-forward equalizer (FFE), a feed-back equalizer (FBE), and an adder coupled respectively with the FFE and the FBE for outputting the equalized signal according to signals outputted from the FFE and the FBE.

3. The device of claim 1 further comprising:
a derotator coupled between the equalizer and the multilevel quantizer for derotating the equalized signal and inputting the derotated equalized signal into the multilevel quantizer; and
a rotator coupled between the multilevel quantizer and the equalizer for rotating the sliced signal outputted from the multilevel quantizer and inputting the rotated sliced signal into the equalizer.

4. The device of claim 3 wherein the rotator is coupled with a feed-back equalizer of the equalizer for rotating the sliced signal, and the rotated sliced signal is a passband signal.

5. The device of claim 1 wherein the predetermined value results from a constant modulus algorithm.

6. The device of claim 1 wherein a first number of bit/bits of the sliced signal when the first mode is adopted is less than a second number of bits of the sliced signal when the second mode is adopted.

7. The device of claim 1, wherein the control logic further executes the following steps:
adopting the first mode and then comparing the first difference with a predetermined threshold which is different from any of the sliced signal and the X threshold/thresholds; and
adopting the second mode instead of the first mode when not only the first difference and the second difference together indicate the unreliable status but also the first difference is larger than the predetermined threshold.

8. The device of claim 7, wherein the control logic obtains the first difference by subtracting the equalized signal from the sliced signal which is the one of the at least X+1 predetermined levels.

9. A signal processing device for generating a sliced signal according to a received signal, comprising:
an equalizer for generating an equalized signal according to the received signal;
a quantizer, coupled to the equalizer, for utilizing X threshold/thresholds to quantize the equalized signal to thereby output the sliced signal being one of at least X+1 predetermined levels when a first mode is adopted, and utilizing Y thresholds to quantize the equalized signal to thereby output the sliced signal being one of at least Y+1 predetermined levels when a second mode is adopted, wherein the X and the Y are positive integers, the Y is more than the X, and the at least Y+1 predetermined levels are more than the at least X+1 predetermined levels; and
a control logic for adopting one of the first mode and the second mode by executing the following steps:
adopting the first mode and then comparing the equalized signal with the sliced signal which is the one of the at least X+1 predetermined levels for obtaining a first difference and comparing the first difference with a predetermined threshold which is different from any of the sliced signal and the X threshold/thresholds;
adopting the second mode instead of the first mode when the first difference is larger than the predetermined threshold; and
adopting the first mode when the first difference is smaller than the predetermined threshold.

10. The signal processing device of claim 9, wherein the control logic obtains the first difference by:
subtracting the equalized signal from the sliced signal which is the one of the at least X+1 predetermined levels.

11. The signal processing device of claim 9, wherein the control logic further executes the following steps:
adopting the first mode and then comparing the equalized signal with a predetermined value which is different from any of the sliced signal and the X threshold/thresholds for obtaining a second difference; and
adopting the second mode instead of the first mode when not only the first difference is larger than the predetermined threshold but also the first difference and the second difference together indicate an unreliable status.

12. A signal processing method for generating a sliced signal according to a received signal, comprising:
generating an equalized signal according to the received signal;
utilizing X threshold/thresholds to quantize the equalized signal to thereby output the sliced signal being one of at least X+1 predetermined levels when a first mode is adopted;
utilizing Y thresholds to quantize the equalized signal to thereby output the sliced signal being one of at least Y+1 predetermined levels when a second mode is adopted, wherein the X and the Y are positive integers, the Y is more than the X, and the at least Y+1 predetermined levels are more than the at least X+1 predetermined levels;
adopting the first mode and then subtracting the equalized signal from the sliced signal which is the one of the at least X+1 predetermined levels for obtaining a first difference and comparing the first difference with a predetermined threshold which is different from any of the sliced signal and the X threshold/thresholds;
adopting the second mode instead of the first mode when the first difference is larger than the predetermined threshold; and
adopting the first mode when the first difference is smaller than the predetermined threshold.

13. The method of claim 12, further comprising:
adopting the first mode and then comparing the equalized signal with a predetermined value which is different from any of the sliced signal and the X threshold/thresholds for obtaining a second difference; and
adopting the second mode instead of the first mode when not only the first difference is larger than the predetermined threshold but also the first difference and the second difference together indicate an unreliable status.

14. The method of claim 12, further comprising:
generating the sliced signal with a first number of bit/bits when the first mode is adopted; and
generating the sliced signal with a second number of bits which is more than the first number of bit/bits when the second mode is adopted.

* * * * *